(12) United States Patent
Lys

(10) Patent No.: US 6,969,954 B2
(45) Date of Patent: Nov. 29, 2005

(54) AUTOMATIC CONFIGURATION SYSTEMS AND METHODS FOR LIGHTING AND OTHER APPLICATIONS

(75) Inventor: Ihor A. Lys, Boston, MA (US)

(73) Assignee: Color Kinetics, Inc., Boston, MA (US)

( * ) Notice: Subject to any disclaimer, the term of this patent is extended or adjusted under 35 U.S.C. 154(b) by 0 days.

(21) Appl. No.: 10/420,506

(22) Filed: Apr. 22, 2003

(65) Prior Publication Data

US 2004/0032226 A1  Feb. 19, 2004

Related U.S. Application Data

(63) Continuation of application No. 09/924,119, filed on Aug. 7, 2001, now abandoned.

(60) Provisional application No. 60/223,491, filed on Aug. 7, 2000.

(51) Int. Cl.[7] ............................................. H05B 37/02
(52) U.S. Cl. ..................... 315/155; 315/152; 315/312; 315/316
(58) Field of Search ................................. 315/312, 316, 315/324, 149–155, 291, 307, 323; 359/165, 359/167, 154, 164, 152

(56) References Cited

U.S. PATENT DOCUMENTS

| | | | |
|---|---|---|---|
| 4,523,128 A | 6/1985 | Zansky et al. | |
| 4,529,980 A | 7/1985 | Liotine et al. | |
| 5,059,871 A | 10/1991 | Pearlman et al. | |
| 5,245,705 A | 9/1993 | Swaney | |
| 5,352,957 A | 10/1994 | Werner | |
| 5,420,572 A | 5/1995 | Dolin, Jr. et al. | |
| 5,455,464 A * | 10/1995 | Gosling ........................ | 307/31 |
| 5,499,510 A | 3/1996 | Mochizuki | |
| 5,603,225 A | 2/1997 | Tobi et al. | |
| 5,621,282 A | 4/1997 | Haskell | |
| 5,630,324 A | 5/1997 | Yoshida et al. | |
| 5,640,061 A | 6/1997 | Bornhorst et al. | |
| 5,838,116 A * | 11/1998 | Katyl et al. .................. | 315/307 |
| 5,866,992 A | 2/1999 | Geiginger et al. | |
| 5,903,373 A | 5/1999 | Welch et al. | |
| 5,929,770 A | 7/1999 | Faita | |
| 6,175,201 B1 | 1/2001 | Sid | |
| 6,252,368 B1 | 6/2001 | Xydis et al. | |
| 6,281,880 B1 | 8/2001 | Rose et al. | |
| 6,424,660 B2 | 7/2002 | Jacobson, Jr. | |
| 6,528,954 B1 | 3/2003 | Lys et al. | |
| 6,548,967 B1 | 4/2003 | Dowling et al. | |
| 6,577,080 B2 | 6/2003 | Lys et al. | |
| 6,608,453 B2 | 8/2003 | Morgan et al. | |
| 6,624,597 B2 | 9/2003 | Dowling et al. | |
| 2001/0033488 A1 | 10/2001 | Chliwnyj et al. | |
| 2002/0038157 A1 | 3/2002 | Dowling et al. | |
| 2002/0044066 A1 | 4/2002 | Dowling et al. | |
| 2002/0047569 A1 | 4/2002 | Dowling et al. | |
| 2002/0047624 A1 | 4/2002 | Stam et al. | |
| 2002/0048169 A1 | 4/2002 | Dowling et al. | |

(Continued)

FOREIGN PATENT DOCUMENTS

EP  0652689 A  5/1995

(Continued)

*Primary Examiner*—Tuyet Thi Vo
(74) *Attorney, Agent, or Firm*—Foley Hoag LLP

(57) ABSTRACT

A system and method for automatic configuration of devices that comprises a receiver for receiving information from a device that uniquely identifies the device, a controller capable of assigning an address to the device, and a communication link for transmitting said information from the receiver to the controller.

22 Claims, 3 Drawing Sheets

U.S. PATENT DOCUMENTS

| | | |
|---|---|---|
| 2002/0057061 A1 | 5/2002 | Mueller et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0130627 A1 | 9/2002 | Dowling et al. |
| 2002/0145394 A1 | 10/2002 | Morgan et al. |
| 2002/0145869 A1 | 10/2002 | Dowling |
| 2002/0152045 A1 | 10/2002 | Dowling et al. |
| 2002/0153851 A1 | 10/2002 | Dowling et al. |
| 2002/0158583 A1 | 10/2002 | Lys et al. |
| 2002/0163316 A1 | 11/2002 | Dowling et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0176259 A1 | 11/2002 | Ducharme |
| 2002/0195975 A1 | 12/2002 | Dowling et al. |
| 2003/0011538 A1 | 1/2003 | Lys et al. |
| 2003/0020333 A1 * | 1/2003 | Ying ............................ 307/38 |
| 2003/0028260 A1 | 2/2003 | Blackwell |
| 2003/0057884 A1 | 3/2003 | Dowling et al. |
| 2003/0057886 A1 | 3/2003 | Lys et al. |
| 2003/0057887 A1 | 3/2003 | Dowling et al. |
| 2003/0057890 A1 | 3/2003 | Lys et al. |
| 2003/0076281 A1 | 4/2003 | Morgan et al. |
| 2003/0100837 A1 | 5/2003 | Lys et al. |
| 2003/0133292 A1 | 7/2003 | Mueller et al. |
| 2003/0137258 A1 | 7/2003 | Piepgras et al. |
| 2003/0189412 A1 | 10/2003 | Cunningham |
| 2003/0222587 A1 | 12/2003 | Dowling et al. |
| 2004/0160199 A1 * | 8/2004 | Morgan et al. ............. 315/312 |

FOREIGN PATENT DOCUMENTS

EP            0687718 A      10/1995

* cited by examiner

AUTOMATIC CONFIGURATION SYSTEMS AND METHODS FOR LIGHTING AND OTHER APPLICATIONS

RELATED APPLICATIONS

This patent application claims the benefit under 35 U.S.C. § 120 as a continuation (CON) application of U.S. Nonprovisional application Ser. No. 09/924,119, filed Aug. 7, 2001, and entitled "Automatic Configuration Systems and Methods for Lighting and other Applications," now abandoned, which in turn claims the benefit of U.S. Provisional Application Ser. No. 60/223,491 filed Aug. 7, 2000, entitled "Automatic Configuration Systems and Methods for Lighting and Other Applications." Both of the foregoing applications are incorporated herein by reference.

BACKGROUND OF THE INVENTION

1. Field of the Invention

The invention relates to systems and methods for the programming of devices, in particular to illumination and display devices.

2. Description of Related Art

Many lighting systems for theatres and entertainment, retail and architectural venues such as casinos, theme parks, stores, malls, etcetera, require elaborate lighting instruments and, in addition, networks to control the lights. One of the designers' most onerous tasks comes after all the lights are in place: configuration. This involves going to each instrument (e.g. light fixture) and determining and setting the network address of each unit through the use of switches or dials and then determining the setup and corresponding element on a lighting board or computer. Two people usually accomplish this and, depending on the distance, use walkie-talkies and enter into a lot of back and forth discussion during the process.

This task can take many hours depending on the locations. For example, a new amusement park ride may use hundreds of lighting fixtures, each of which is controlled over a network, that are neither line-of-sight to each other or to any single point. Each one must be identified and a correspondence made between the light and its setting on the lighting control board. Mix-ups and confusion are common during this process.

It would be useful to have a system that allowed each light to be separately queried, automatically determine which light it is and then set an address and store it onboard the light.

SUMMARY OF THE INVENTION

One embodiment of the invention is directed to a system for automatic configuration of network devices. The system comprises a receiver to receive information from a network device that uniquely identifies the device, a controller capable of assigning an address to the device, and a communication link to transmit said information from the receiver to the controller.

Another embodiment is directed to a method for the configuration of network devices. The method may comprise the acts of communicating a unique identifier from a network device to a remote receiver, communicating the unique identifier from the remote receiver to a controller, generating a network address, and communicating the network address from the controller to the network device from which the unique identifier was originally communicated.

A further embodiment of the present invention is directed to a method for the configuration of network devices. The method may comprise acts of communicating a first unique identifier from a first network device to a remote receiving device, storing the first unique identifier in memory in the remote receiving device, communicating the first unique identifier from the memory to a controller, generating a first network address, and communicating the first network address from the controller to the first network device.

DETAILED DESCRIPTION OF THE PREFERRED EMBODIMENT(S)

The systems and methods disclosed herein may be used with numerous types of lighting systems, and are not limited to use with any particular type of lighting system. For example, the systems and methods disclosed herein can be used with lighting systems of the type disclosed in U.S. Pat. No. 6,016,038 and PCT Pub. No. WO 99/31560, the entire disclosures of which are herein incorporated by reference.

Networked lighting devices may have their addresses set through a series of switches such as dials, dip switches or buttons. These switches are individually set to particular addresses for use in networking, which is a cumbersome process. Disclosed herein is a novel system for setting addresses.

During manufacturing, each light typically is programmed with a unique serial number, such that no two devices share the serial number. This serial number is typically ignored by the user and a network address of the device is specified independent of the serial number. The network address can be set through switches such as the physical switches described earlier or even electronically stored in volatile or non-volatile memory.

Figure 1:
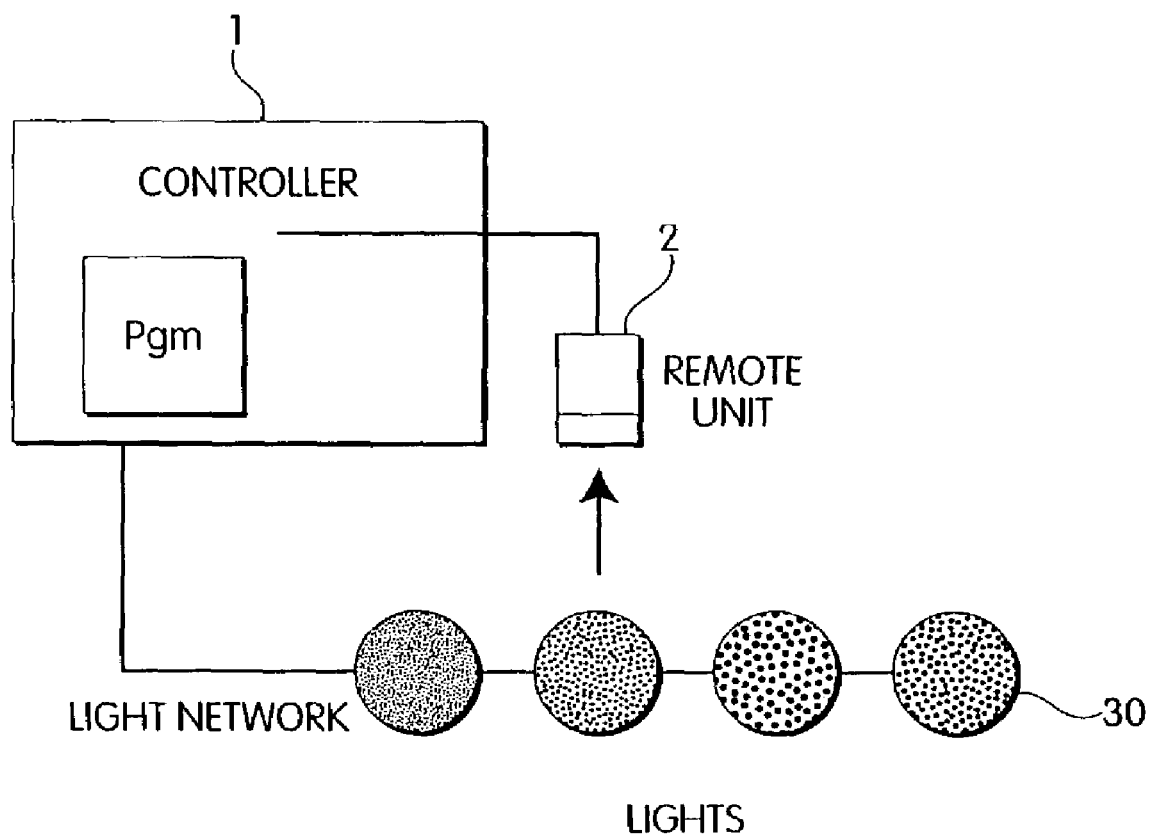
FIG. 1 is a block diagram of a system according to one embodiment of the invention.

Referring now to the embodiment of FIG. 1, for auto-configuration of lights a plurality of devices 30, such as lights, are connected to a first component 1 of the auto-configuration system. The first component 1 can be a controller such as a computer or dedicated device for receiving and transmitting information over the lighting network.

The first component 1 broadcasts a command to all devices 30 on the network to enter a special operations mode (auto-config mode). The devices 30 or lights enter the auto-config mode and await additional commands. In the auto-config mode, each device 30 can send a hardware serial number over a communication channel other than the lighting network. The communication channel may employ, for example, IR, RF, magnetic induction, acoustic energy, etc. In one embodiment, this communication channel may also be a wired channel. In one embodiment for LED-based color-changing fixtures, one or more red LED's may be used with standard IR protocols such as IRDA. This signal may be received using a second component 2, which can receive data using the above techniques, which include, for example, an IR receiver sensitive to visible light in the red spectrum.

This information may be transmitted to first component 1 using another communication channel, e.g., a wireless channel. When the first component 1 receives one of the hardware serial numbers, the first component 1 then issues a specific command to the network using that one of the hardware serial numbers. A corresponding device or fixture may then receive the specific command and set any appropriate values for that device or fixture. Information included in the specific command may include, for example, a network address for the fixture or device 30 using the hardware serial number. The first component 1 may assign sequential network addresses as fixtures or devices 30 are added to or read from the lighting network. Alternatively, network addresses may instead be generated according to current time, geometric coordinates, or any other numbering methodology that permits a unique network address for each new device or fixture.

In one embodiment, more than one device may be attached to a network wherein at least one of the devices may be arranged as an address hub. For example, a lighting network may be arranged with several address hubs wherein the address hubs communicate to lights. The lighting network may be set into an auto-config mode wherein the address hubs go enter an auto configuration mode. Each of the address hubs may then be programmed with an address as described herein. The address hub may then address its associated lighting devices. This may be a convenient method of addressing rows of lighting devices for example. A lighting installation may have fifty, one hundred row, strings of lights on a building, for example, wherein the individual light strings are associated with address hubs. The fifty address hubs may be addressed with a system according to the present invention and then each hub may address its light string. In an embodiment, an address hub may be incorporated into another device (e.g., a lighting device) or it may be a dedicated hub.

Figure 2:
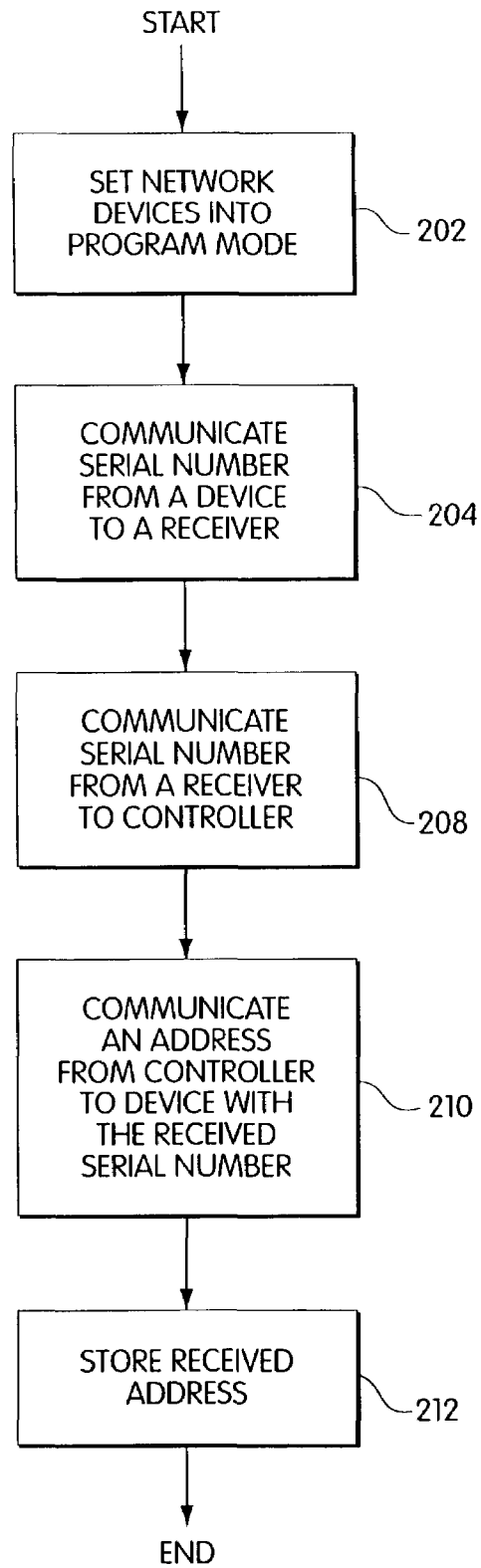
FIG. 2 is a flow diagram of a process of assigning addresses according to the principles of the present invention.

FIG. 2 illustrates a flow diagram of a process according to one embodiment of the present invention. As indicated in the flow diagram, the network devices may be set into a program mode (e.g. auto-config mode) in act 202, and then the network device may communicate a unique identifier (e.g. serial number) to a receiver in act 204. The receiver may in turn communicate the unique identifier to a controller in act 208. In response to receiving the unique identifier, the controller, in act 210, may then communicate an address or other information to the network device that originally communicated the unique identifier. Upon receipt of the address, the network device may store the received address as its communication address in act 212, such that the device will respond to network information designating this address.

In one embodiment, lighting devices 30 may be arranged on a network. The lighting devices may be set in a mode to communicate their unique identifiers such that all of the devices are sending the information at the same or nearly the same time. A receiving device 2 (FIG. 1) may move from one lighting device 30 to the next, consecutively storing the unique identifiers in memory. After reading the unique identifiers from several lighting devices and storing the same in the receiving device, the identifiers may be communicated to a controller 1. This may be a useful technique for addressing several lighting devices that are arranged in a row, for example. The serial numbers for an entire row of lights may be received and stored and then communicated to a central controller once the receiving operation is complete. The controller may then go through a series of commands to communicate addresses to the individual lighting devices as described herein. It should be appreciated that the present invention is not limited to employing a receiving device 2 that stores a plurality of unique identifiers for various lighting devices 30 and then downloads them collectively to the controller 1, as the receiving device 2 can alternatively store a unique identifier from one of the lighting devices 30 and download it to the controller 1 prior to collecting another identifier for a different lighting device 30.

The first component 1 and the second component 2 may be implemented separately or integrated into a single enclosure, for example, on the same CPU or on the same printed circuit board. The first component 1 and the second component 2 can be a standard computer with IRDA outputs. Many types of scanners and readers can be used as a model for such a device. The first component 1 and the second component 2 may cooperate without being in a continuous communicating relationship. For example, the first component 1 may issue an auto-config command, and the second component 2 may then gather data from fixtures and devices, either from a fixed location or by moving the second component 2 into physical proximity with each device or fixture connected to the lighting network. The second component 2 may then open a communication channel to the first component 1, and transmit any data that has been collected from the devices and fixtures. The hardware serial numbers can be stored in the second component 2, downloaded to the first component 1 and then the addresses can be set. If the first component 1 and the second component 2 are in a single enclosure, then they can be connected to the lighting network, set to provide auto-configuration, disconnected from the lighting network, read the hardware serial numbers, and then finally, re-connect to the lighting network to issue commands for setting the network addresses.

The fixtures or devices 30 may optionally include circuitry and transceivers to transmit hardware serial numbers and other information to the first component 1 over a communication channel other than those provided by the lighting network, using, for example, IR, RF, and so forth. The fixtures or devices 30 may optionally include circuitry and transceivers to receive network address programming commands over a communication channel using, for example, IR, RF, and so forth. Network addresses might be set, for example, using a pointing laser from a large distance. This may be useful for lights installed at inconvenient heights and locations.

In one embodiment, the devices 30 may respond to receipt of data from the controller 1 by producing a particular signal. For example, in a lighting network, the lighting device may respond to the receipt of a new address by turning blue. The user that originally received the serial number from the light may than confirm the proper light received the address. In a speaker network, the addressed speaker may make a particular sound for example.

The second component 2 may be a handheld device for receiving and sending auto-configuration set up data to a plurality of fixtures and/or devices in a lighting network.

In one embodiment, an LED-based light or similar solid-state technology such as Electro-luminescent (EL) or an organic LED-based device (OLED) can be used to transmit data. Such a light may be automatically configured through the transmission of a unique identity number or code through a means that is permanently affixed to the light. This identifier can be stored in any of numerous ways. Examples include a hardwired series of jumpers, EPROM and other memory technologies, or switches. The second device 2, possibly handheld, can receive the sequence and include the capability of uniquely accessing that light and adjust its settings. These settings may include, but are not limited too, such information as network address, properties of the light, location, purpose etc. The second device 2, the receiver, can then transfer such information back to a controller 1, which can then set the light addresses by sending a unique sequence to store the address information in the light.

In one embodiment, upon power-up, all the fixtures may be used in a regular manner and allow a variety of stand-alone modes and network control. When sent into network mode, a particular broadcast packet of information can be sent over the lighting network to trigger an automatic configuration mode of the light. This command may cause the individual lighting controller to strobe the LEDs in such a way to provide a data signal and emit data in a pattern corresponding to the unique identifier.

The controller may send out a packet over the network that all lights listen and respond to. Each light, in response to this packet, may send out a repeated sequence of characters that includes the serial number. The repeated sequence may be accomplished by pulsing the LEDs with a unique sequence that identifies that particular unit. In one embodiment, the device's serial number may be used.

A small handheld device may read the information from the lights, but this information could also be generated by other techniques including IR, and other forms of wireless control. This signal is sent back to the computer to determine which unit is currently identified. This signal can be transmitted through a wired unit or, more conveniently, through a one-way RF link. This unit can then be uniquely addressed and controlled. At this point, a sequence is sent to the unit to program a base address for traditional network control. The identification of the fixture and the setting of the address is done. This may all happen in less than one second, and a series of 50–100 lights across a room may be fully set within five minutes.

In one embodiment, additional enhancements could allow two-way information transfer between the handheld unit and the control console. The program running on the control console may read the data from the handheld unit and controls the lights.

Inserting a new address into the order and re-addressing the sequence can also change the order in which the units are controlled for special effects. For example, if it were desired to send a rainbow to propagate across a room, the manner of propagation may suggest a corresponding sequence of network addresses. Matching network addresses to the direction of propagation may simplify subsequent coding of the desired effect. The auto-configuration systems and methods disclosed herein may be used to track and control lights for such effects as a color or series of colors moving along a room.

The methods and systems disclosed herein may be usefully employed to reconfigure an existing lighting network when, for example, fixtures are added, removed, or replaced. As the topology of the lighting network changes, network addresses may be conveniently changed as well.

LEDs can be modulated through a number of techniques. One such technique is known as Pulse-Width Modulation (PWM). This technique can provide, through pulses of varying width, a way to control the intensity of the LEDs as seen by the eye. Because the duty-cycle and pulse width is very small, imperceptible by the eye, small changes in the PWM signal can also be used to provide data communications. Other techniques involve providing varying pulse amplitude techniques, and analog control of the LEDs. There are many methods of controlling the LEDs in a system according to the principles of the present invention and this invention is not limited to any particular technique.

Through these LED modulation techniques it is then possible to use lights as illumination sources and as nodes in a lighting network. The output of the light can be picked up by a receiver to decode and interpret the signals from the lighting devices. In one embodiment, a device may include separate lighting and communication components. In another embodiment, a device may use a lighting component (e.g., an LED) for both illumination and communication.

In addition to applications within a lighting network, the above handheld device for programming network addresses, and methods and systems for using same, may be usefully applied to other distributed devices, e.g., speaker systems, telephone systems, sensor systems, microphone systems, switch systems or any other system of distributed, networked devices.

Figure 3:
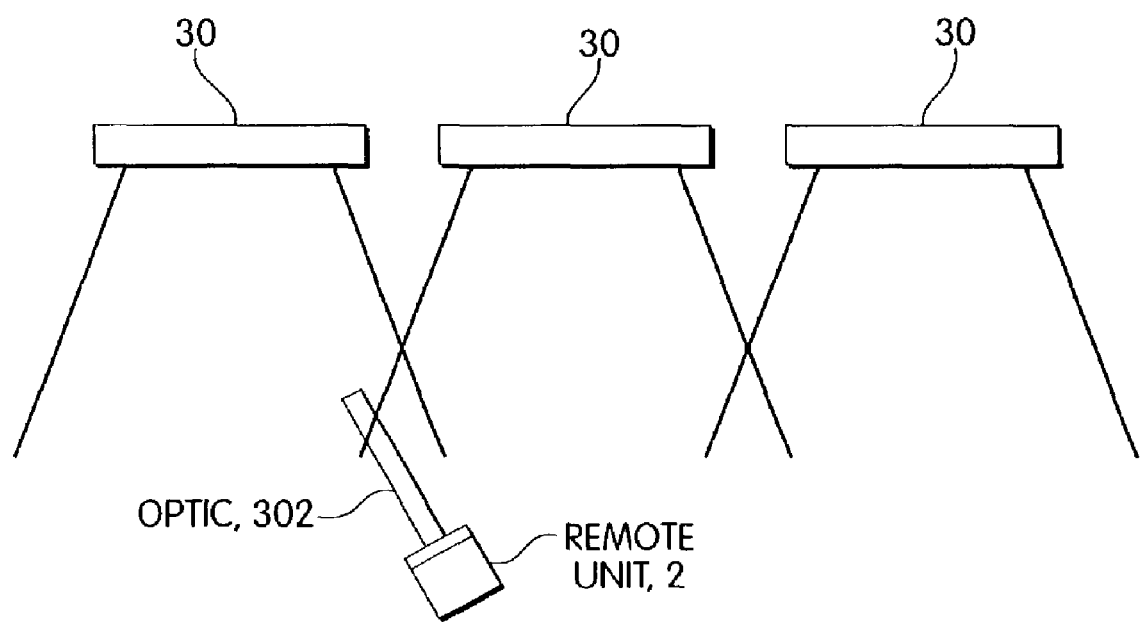
FIG. 3 illustrates another configuration system according to the principles of the present invention.

In one embodiment, a remote unit 2 may include optics 302 (FIG. 3) to prevent or minimize interference from nearby network devices during communication or minimize the effect of stray light. An optic may be a tube, for example, such that the light from adjacent lighting systems do not interfere with communication from the intended light. There are many techniques to minimize stray light or other noise in a system according to the principles of the present invention, and this invention is not limited to employing any particular technique. In one embodiment, a remote unit 2 may include circuitry or a processor to detect the strength of a signal or the interference of other signals. For example, the remote unit 2 may indicate when it is reading more than one serial number at any one time and not allow communication until the interference is eliminated.

As used herein, the term "LED" should be understood to include light emitting diodes of all types, light emitting polymers, semiconductor dies that produce light in response to current, organic LEDs, electro-luminescent strips, and other such systems. "LED" may refer to a single light emitting diode having multiple semiconductor dies that are individually controlled. It should also be understood that the term "LED" does not restrict the package type of the LED. The term "LED" includes packaged LEDs, non-packaged LEDs, surface mount LEDs, chip on board LEDs and LEDs of all other configurations. The term "LED" also includes LEDs packaged or associated with material (e.g., a phosphor) wherein the material may convert energy from the LED to a different wavelength.

While the invention has been disclosed in connection with the preferred embodiments shown and described in detail, various modifications and improvements thereon will become readily apparent to those skilled in the art. Accordingly, the spirit and scope of the present invention is to be limited only by the following claims and their equivalents.

What is claimed is:

1. A system of networked illumination devices, comprising:

at least one illumination device configured and arranged to provide at least visible light over an area and to transmit information that uniquely identifies the at least one illumination device;

a receiver configured and arranged to receive the information from the illumination device;

a controller configured and arranged to assign at least one network address to the illumination device in response to the information received from the illumination device; and a communication link between the receiver and the controller to transmit said information from the receiver to the controller.

2. The system of claim 1, wherein said controller is a computing device.

3. The system of claim 1, wherein said receiver is handheld.

4. The system of claim 1, wherein the information includes a serial number of the at least one illumination source.

5. The system of claim 1, wherein said communication link comprises a wireless communication link.

6. The system of claim 1, wherein said illumination device includes at least one LED to provide at least some of the visible light.

7. The system of claim 6, wherein said at least one LED is operated so as to generate the information that uniquely identifies the illumination device to the receiver.

8. A method for the configuration of illumination devices, comprising acts of:
projecting at least visible light from at least one illumination device to illuminate an area;
transmitting from the at least one illumination device information that uniquely identifies the at least one illumination device;
generating a network address in response to the information; and
communicating the network address to the at least one illumination device from which the information was communicated.

9. The method of claim 8, further comprising an act of:
storing the network address in a memory of the at least one illumination device such that the at least one illumination device will respond to network signals communicated to the address.

10. The method of claim 8, wherein the at least one illumination device is an LED lighting device.

11. The method of claim 8, wherein the step of transmitting is accomplished through wireless communication.

12. The method of claim 8, wherein the information comprises a serial number of the at least one illumination device.

13. The method of claim 8, wherein the step of communicating the network address comprises projecting radiation, and the method further comprises an act of collecting light using an optic.

14. The method of claim 8, further comprising an act of communicating the information from a remote receiver to a controller prior to generating the network address through wireless communication.

15. The method of claim 8, wherein the act of generating a network address comprises selecting a network address.

16. The method of claim 8, wherein the act of generating a network address further comprises incrementing a previously generated and communicated network address.

17. The method of claim 11, wherein the wireless communication is accomplished through visible light producing LEDs.

18. The method of claim 17, wherein the LEDs produce red light.

19. The method of claim 17, wherein the LEDs are used for both the steps of projecting and transmitting.

20. A method for the configuration of illumination devices, comprising acts of:
projecting at least visible light from a first illumination device to illuminate an area;
transmitting from the illumination device first information that uniquely identifies the first illumination device;
storing the first information in memory in a remote receiving device;
generating a first network address in response to the first information; and
communicating the first network address to the first illumination device.

21. The method of claim 20, further comprising acts of:
communicating second information from a second illumination device to the remote receiving device;
storing the second information in the memory;
generating a second network address in response to the second information; and
communicating the second network address to the second illumination device.

22. The method of claim 21, further comprising an act of communicating the first and second information from the memory of the remote receiving device to a controller.

* * * * *